United States Patent

Kumaki et al.

[11] Patent Number: 5,263,024
[45] Date of Patent: Nov. 16, 1993

[54] PRELIMINARY OPERATION SYSTEM IN ATM NETWORK USING FLAG FOR INDICATING PRELIMINARY OPERATION MODE

[75] Inventors: Yoshinari Kumaki, Chiba; Yasuro Shobatake, Kanagawa, both of Japan

[73] Assignee: Kabushiki Kaisha Toshiba, Kawasaki, Japan

[21] Appl. No.: 818,042

[22] Filed: Jan. 8, 1992

[30] Foreign Application Priority Data

Jan. 8, 1991 [JP] Japan .................................. 3-000764

[51] Int. Cl.$^5$ .............................................. H04J 3/24
[52] U.S. Cl. .................................................. 370/94.1
[58] Field of Search ...................... 370/94.1, 60, 95.1, 370/94.3, 54, 60.1, 110.1

[56] References Cited

U.S. PATENT DOCUMENTS 5,029,163  7/1991  Chao et al. .......................... 370/95.1
5,051,989  9/1991  Negishi et al. ...................... 370/95.1
5,130,984  7/1992  Cisneros ............................. 370/94.1

Primary Examiner—Douglas W. Olms
Assistant Examiner—Shick Hom
Attorney, Agent, or Firm—Oblon, Spivak, McClelland, Maier & Neustadt

[57] ABSTRACT

A preliminary operation system in an ATM network capable of preventing the erroneous cell transmissions due to the header transformation operation during the rewriting of the header transformation table, and recognizing cells of different cell types without using additional hardware components. The system includes a header transformation table for storing a header transformation information including a flag for indicating a preliminary operation mode either in a form of a state of the header transformation table or a type of cell for each cell; and a preliminary operation device for transforming a header of each cell into a format suitable for the ATM cell switch by utilizing the header transformation information stored in the header transformation table, according to the indication of the flag.

12 Claims, 2 Drawing Sheets

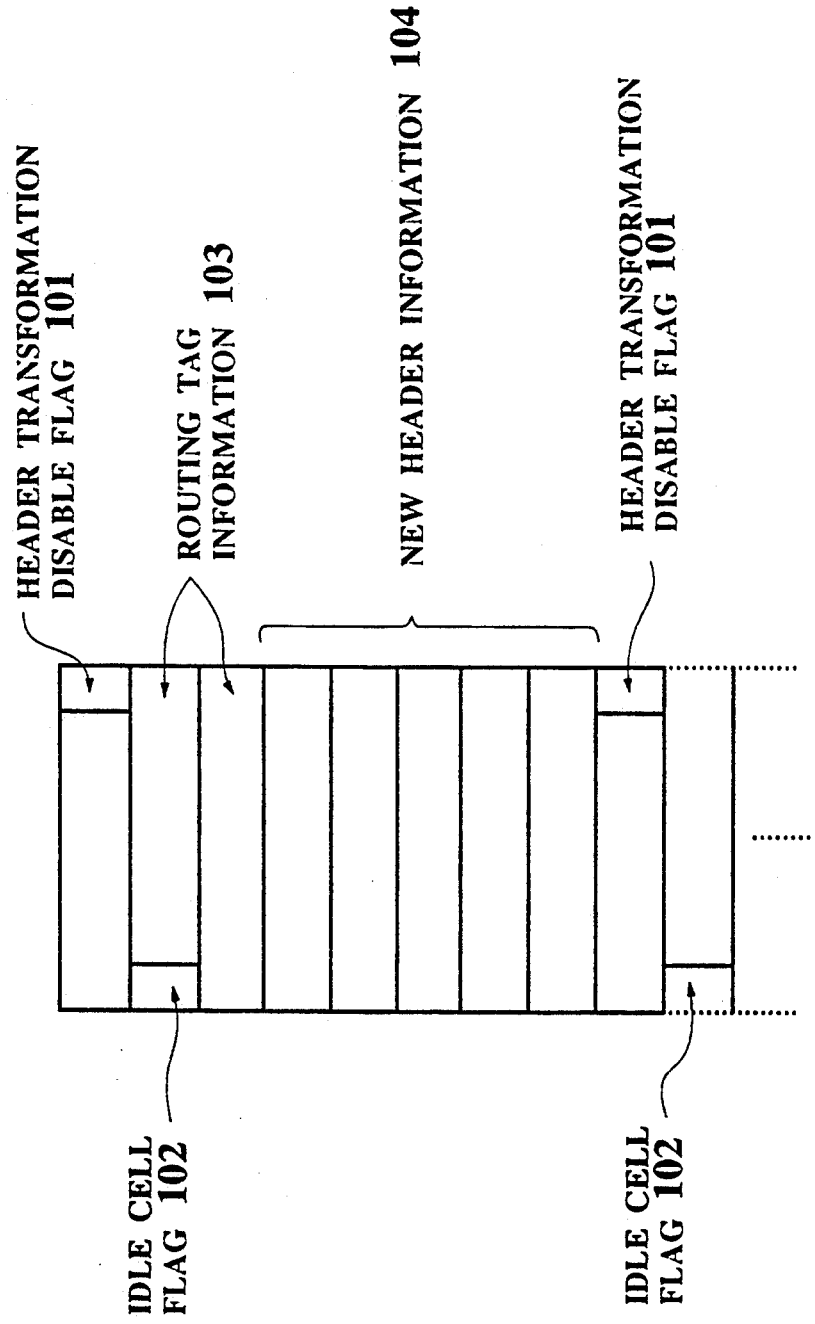

PRELIMINARY OPERATION SYSTEM IN ATM NETWORK USING FLAG FOR INDICATING PRELIMINARY OPERATION MODE

BACKGROUND OF THE INVENTION

1. Field of the Invention

The present invention relates to a header transformation table used in transforming a header information of a cell in an ATM network, and a preliminary operation system including such a header transformation table which is to be provided between input transmission paths and an ATM switch in an ATM network, and which carries out a preliminary operation for appropriately transforming a cell format by using the header transformation table.

2. Description of the Background Art

As a conventional data transmission mode in a communication network such as a telephone network, a so called ATM (Asynchronous Transfer Mode) is known. In this ATM, the data are transmitted in a form of a short packet of a fixed length called a cell, and each terminal utilizes as much of the data transmission capacity of the network as necessary whenever the need for the transmission of cells arises. As a consequence, the ATM has an advantage of being capable of improving the transmission efficiency in the network.

In such an ATM network, it is necessary to provide a number of cell switches, each of which has a function of switching cells transmitted from a plurality of input transmission paths into a plurality of output transmission paths.

In addition, it is also necessary to provide a preliminary operation system between the input transmission paths and such a cell switch, which carries out a preliminary operation including the following operations with respect to each cell entering from the input transmission paths.

(1) A header transformation operation for transforming a header information of each cell by using a header transformation table.

(2) An operation for attaching a routing tag information indicating an output transmission path through which each cell is to be outputted.

(3) An operation for inserting and deleting idle cells.

(4) An operation for alleviating the timing requirements by using the internal buffers as an elastic store, that is an operation for elastic function.

However, a conventional preliminary operation system in a conventional ATM network has been associated with the following problems.

First, there are cases in which the header transformation table needs to be rewritten, so that when the header transformation operation is carried out by making an access to the header transformation table which happens to be in a process of being rewritten at a time of this access, the header transformation operation may not be carried out correctly and consistently and the erroneous cell transmissions may be caused in a conventional preliminary operation system.

Secondly, in order to recognize the idle cell, it has been necessary to look up the header information of each cell and compare that looked up header information with a prescribed idle cell header information pattern in a conventional preliminary operation system, such that additional hardware components are required for a comparator and a register to memorize the prescribed idle cell header pattern.

Similarly, the additional hardware components are necessary in a conventional preliminary operation system in order to carry out other cell type recognition operations similar to that of the idle cells described above, including a recognition of cells to be processed differently such as branching cells.

SUMMARY OF THE INVENTION

It is therefore an object of the present invention to provide a preliminary operation system in an ATM network capable of preventing the erroneous cell transmissions due to the header transformation operation during the rewriting of the header transformation table.

It is another object of the present invention to provide a preliminary operation system in an ATM network capable of carrying out an operation for recognizing cells of different cell types with reduced hardware components.

According to one aspect of the present invention there is provided a preliminary operation system in an ATM network for carrying out a preliminary operation on cells to be transmitted to an ATM cell switch of the ATM network from input transmission paths, comprising: header transformation table means for storing a header transformation information including a flag for indicating a state of the header transformation table means at a time an access is made to the header transformation means; and preliminary operation means for transforming a header of each cell entered from the input transmission paths into a format suitable for the ATM cell switch so as to obtain a header transformed cell corresponding to said each cell, by making an access to the header transformation table means in order to utilize the header transformation information stored in the header transformation table means, according to the state indicated by the flag, and outputting the header transformed cell to the ATM cell switch.

According to another aspect of the present invention there is provided a preliminary operation system in an ATM network for carrying out a preliminary operation on cells to be transmitted to an ATM cell switch of the ATM network from input transmission paths, comprising: header transformation table means for storing a header transformation information including a flag for indicating a type of cell for each cell entered from the input transmission paths; and preliminary operation means for transforming a header of each cell entered from the input transmission paths into a format suitable for the ATM cell switch so as to obtain a header transformed cell corresponding to said each cell, by making an access to the header transformation table means in order to utilize the header transformation information stored in the header transformation table means, according to the type of cell indicated by the flag, and outputting the header transformed cell to the ATM cell switch.

Other features and advantages of the present invention will become apparent from the following description taken in conjunction with the accompanying drawings.

BRIEF DESCRIPTION OF THE DRAWINGS

FIG. 2 is a schematic diagram of a header transformation information stored in a header transformation table in the preliminary operation system of FIG. 1.

DETAILED DESCRIPTION OF THE PREFERRED EMBODIMENTS

Figure 1:
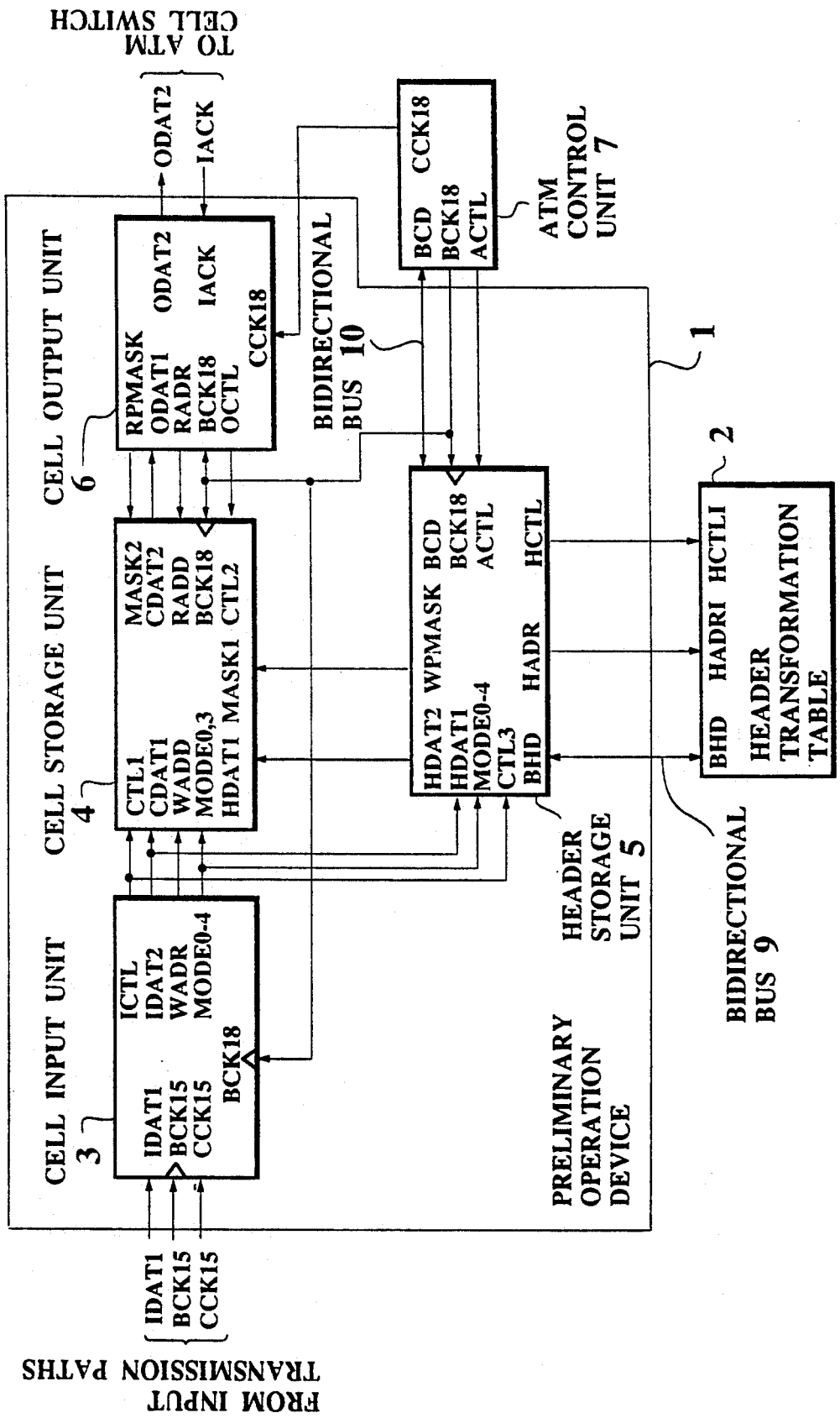
FIG. 1 is a block diagram of one embodiment of a preliminary operation system in an ATM network according to the present invention.

Referring now to FIG. 1, one embodiment of a preliminary operation system in an ATM network according to the present invention will be described in detail.

In this embodiment, the preliminary operation system includes a preliminary operation device 1 comprising: a cell input unit 3 for receiving cells entered from a plurality of input transmission paths; a cell storage unit 4 for obtaining and storing a header transformed cell from each cell received by the cell input unit 3 and a header transformation information; a header storage unit 5 for storing a header information extracted from each cell received by the cell input unit 3 and the header transformation information to be supplied to the cell storage unit 4; and a cell output unit 6 for outputting the header transformed cell stored in the cell storage unit 4.

In addition, this preliminary operation device 1 is associated with a header transformation table 2 for storing various different patterns of the header transformation information to be supplied to the header storage unit 5; and an ATM control unit 7 for supplying various timing and control signals to the preliminary operation device 1, and rewriting the header transformation information stored in the header transformation table 2 through the preliminary operation device 1. The ATM control unit 7 and the header transformation table 2 can exchange the data through a bidirectional bus 9 for a BHD signal provided between the header storage unit 5 and the header transformation table 2 and a bidirectional bus 10 for a BCD signal provided between the header storage unit 5 and the ATM control unit 7.

The operation and various internal signals of this preliminary operation system will be described in further detail below.

Now, in this embodiment, as shown in FIG. 2, each header transformation information in the header transformation table 2 contains: a header transformation disable flag (referred hereafter as HTD flag) 101 for indicating whether or not the header transformation table 2 is in a process of being rewritten; an idle cell flag 102 for indicating whether or not a cell is the idle cell; a routing tag information 103 for indicating a route of cell transmission at a cell switch; and a new header information 104 to be given to a cell at the cell storage unit 4 in order to obtain the header transformed cell. One set of these HTD flag 101, idle cell flag 102, routing tag information 103, and new header information 104 is transmitted together from the header transformation table 2 to the preliminary operation device 1 as one header transformation information.

Here, one set of the header transformation information in the header transformation table 2 is specified by an address signal given in terms of a read out base address signal for indicating an address of an appropriate HTD flag 101 which specifies a base address for starting the reading operation and offset address signals for indicating head addresses of data lines for this set of the header transformation information with respect to the read out base address. The read out base address signal can be constructed from the header information of each cell entered from the input transmission paths in a case the header transformation informations are arranged in correspondence to the various types of the header information of the cell in advance. The offset address signals can be constructed by using a counter for counting addresses of the header transformation table 2 one by one.

Such an address signal is generated at the header storage unit 5 according to a data signal provided by the ATM control unit 7, and supplied from the header storage unit 5 to the header transformation table 2 in a case of making an access to the header transformation table 2 for the sake of carrying out the header transformation operation.

Now, the operation in this preliminary operation system shown in FIG. 1 will be outlined.

First, each cell entering from the input transmission paths is received and temporarily stored in the cell input unit 3 according to a timing signal provided by the ATM control unit 7.

Then, the cell temporarily stored in the cell input unit 3 and the appropriate header transformation information are written into the cell storage unit 4 according to a BCK18 signal which is a system clock of this ATM cell switch system as a whole, in the following procedure.

(1) The header information of the cell temporarily stored in the cell input unit 3 is written into the cell storage unit 4 and the header storage unit 5.

(2) The header storage unit 5 makes an access to the header transformation table 2 by using the header information given from the cell input unit 3 as the read out base address and receives the appropriate header transformation information containing one set of the HTD flag 101, idle cell flag 102, routing tag information 103, and new header information 104.

(3) The routing tag information 103 and the new header information 104 of the appropriate header transformation information obtained from the header transformation table 2 are then supplied from the header storage unit 5 to the cell storage unit 4 and then written into the corresponding cell stored in the cell storage unit 4, so as to generate the header transformed cell, according to the indications of the HTD flag 101 and the idle cell flag 102 of the appropriate header transformation information.

Namely, when either one of the HTD flag 101 and the idle cell flag 102 is in an active state, indicating that the header transformation table 2 is in a process of being rewritten or that the cell is the idle cell, respectively, the header transformation information is regarded as invalid and the corresponding cell is discarded in order to avoid the erroneous cell transmission due to this invalid header transformation information.

The header transformed cell obtained at the cell storage unit 4 is then read out to the cell output unit 6 at a timing specified by the cell output unit 6 and temporarily stored in the cell output unit 6. The cell temporarily stored in the cell output unit 6 is then outputted to the ATM cell switch according to the BCK18 signal and a CCK18 signal which indicates a head of a cell in the ATM cell switch system.

Thus, according to this embodiment, it becomes possible to prevent the erroneous cell transmissions due to the header transformation operation during the rewriting of the header transformation table, by discarding the erroneously header transformed cell according to the indication of the HTD flag provided in the header transformation information transmitted from the header transformation table to the preliminary operation device.

Moreover, according to this embodiment, it becomes possible to recognize cells of different cell types such as idle cells and non-idle cells without using additional hardware components, by utilizing the indication of the idle cell flag provided in the header transformation information transmitted from the header transformation table to the preliminary operation device.

Now, further details of the preliminary operation system shown in FIG. 1 will be described.

The ATM control unit 7 provides the BCK18 signal representing a system clock of the ATM cell switch system, the CCK18 signal indicating a head of a cell in the ATM cell switch system, and an ACTL signal which is a control signal to be given to the header storage unit 5. This ACTL signal specifies the execution of the read/write operation between the header transformation table 2 and the ATM control unit 7 through the bidirectional buses 9 and 10 for the BHD signal and the BCD signal, and indicates the currently executed operation as either one of the address information transmission or the data information transmission.

The header transformation table 2 stores various different patterns of the header transformation information to be supplied to the header storage unit 5, where each header transformation information contains the HTD flag 101, idle cell flag 102, routing tag information 103, and new header information 104. The read/write operation with respect to the header transformation table 2 is carried out through the bidirectional buses 9 and 10 for the BHD signal and the BCD signal, according to an HCTLI signal which is an operation control signal and an HADRI signal which is a read/write address signal given from the header storage unit 5.

The cell input unit 3 receives and temporarily stores the cells entered from the input transmission paths in terms of serial data signals IDAT1 according to a BCK15 signal which is a system clock of the input transmission path system and a CCK15 signal which indicates a head of a cell in the input transmission path system.

Then, the cell input unit 3 outputs the received cells in terms of parallel data signals IDAT2 to the cell storage unit 4 and the header storage unit 5 in synchronization to the system clock of the ATM cell switch system given by the BCK18 signal. In other words, at the cell input unit 3, the operation for elastic function from the system clock of the input transmission path system given by the BCK15 signal to the system clock of the ATM cell switch system given by the BCK18 signal is carried out, such that the cell input unit 3 also outputs an ICTL signal for controlling the operation of data writing to the cell storage unit 4 in synchronization to the BCK18 signal.

In addition, the cell input unit 3 also generates and outputs a WADR signal which is a writing address signal to the cell storage unit 4. Furthermore, the cell input unit 3 also generates MODE0 to MODE4 signals for indicating various transfer operation modes among various units as specified below, of which the MODE0 and MODE3 signals are outputted to the cell storage unit 4 while the MODE0 to MODE4 signals are outputted to the header storage unit 5.

The MODE0 signal indicates a transfer mode in which the header information is transferred from the cell input unit 3 to the cell storage unit 4 and the header storage unit 5.

The MODE1 signal indicates a mode for generating the read out base address signals for the header transformation table 2 from the header information stored in the header storage unit 5.

The MODE2 signal indicates a mode in which the header transformation information data are read out from the header transformation table 2 according to the read out base address signals generated by the operation due to the MODE1 signal and the offset address signals for the header transformation table 2 generated by using an internal counter of the header storage unit 5, and then the read out header transformation information data are written into the header storage unit 5.

The MODE3 signal indicates a transfer mode in which the header transformation information data are transferred from the header storage unit 5 to the cell storage unit 4.

The MODE4 signal indicates a mode for exchanging data between the header transformation table 2 and the ATM control unit 7 through the header storage unit 5.

The cell storage unit 4 receives and stores the cells outputted by the cell input unit 3 and the header transformation information outputted by the header storage unit 5 as a CDAT1 signal and an HDAT1 signal, respectively, according to a CTL1 signal which controls the cell writing timing, a WADD signal which is a writing address signal, and the MODE0 and MODE3 signals.

In addition, the cell storage unit 4 outputs the stored cells to the cell output unit 6 according to a CTL2 signal which controls a cell read out timing and an RADD signal which is a read out address signal, where both of these CTL2 signal and the RADD signal are given by the cell output unit 6.

Moreover, the cell storage unit 4 has a plurality of cell buffers, each of which is capable of storing one cell, and a writing pointer WP and a reading pointer RP for pointing one of the cell buffers with respect to which the writing and reading operations are to be executed currently. Namely, the writing and reading operations with respect to the cell buffers are carried out by setting the writing pointer WP and the reading pointer RP as the writing and reading base address signals, the WADD signals as the offset address signals for the writing base address signals, and the RADD signals as the offset address signals for the reading base address signals. At the end of each cell writing or cell reading operation, an increment is given to the writing pointer WP or the reading pointer RP, respectively, such that these cell buffers can be virtually regarded as one buffer capable of storing a plurality of cells. Here, the increment to the writing pointer WP is given only when an inactive state is indicated by a MASK1 signal supplied from the header storage unit 5 to the cell storage unit 4 which indicates whether the increment should be given. Similarly, the increment to the reading pointer RP is given only when an inactive state is indicated by a MASK2 signal supplied from the cell output unit 6 to the cell storage unit 4 which indicates whether the increment should be given.

The header storage unit 5 receives the header transformation information from the header transformation table 2 when the MODE2 signal is in an active state, supplies the routing tag information and the new header information of the header transformation information read out from the header transformation table 2 to the cell storage unit 4 when the MODE3 signal is in an active state, and intermediates the data exchange between the ATM control unit 7 and the header transformation table 2 when the MODE4 signal is in an active state.

More specifically, the header storage unit 5 operates as follows.

First, the header storage unit 5 temporarily stores the header information supplied from the cell input unit 3 in terms of the HADT1 signals according to a CTL3 signal indicating the timing for writing the header information and the MODE0 signal.

Next, when the MODE0 signal and the MODE1 signal are in active states, the header storage unit 5 generates the read out base address signal for reading the header transformation information from the header transformation table 2 by using the temporarily stored header information.

Then, when the MODE2 signal is in an active state, the header storage unit 5 generates the address signals HADR to be given to the header transformation table 2 by using the generated read out base address signal and the internal counter of the header storage unit 5.

Next, the header storage unit 5 generates an HCTL signal for controlling the reading and writing operations with respect to the header transformation table 2 according to the ACTL signals supplied from the ATM control unit 7 and the MODE2 signal and the MODE4 signal supplied from the cell input unit 3.

Then, when the MODE2 signal is in an active state, using these generated HADR signal and the HCTL signal, the header storage unit 5 makes an access to the header transformation table 2, receives the appropriate header transformation information from the header transformation table 2 in terms of the BHD signals through the bidirectional bus 9, and stored the received header transformation information.

Finally, when the MODE3 signal is in an active state, the header storage unit 5 outputs the routing tag information and the new header information of the header transformation information read out from the header transformation table 2 to the cell storage unit 4 in terms of the HADT2 signals.

Now, the operation of the header storage unit 5 in a case of intermediating the data exchange between the ATM control unit 7 and the header transformation table 2 for the purpose of rewriting the header transformation table 2 will be described.

First, a case of data transfer from the ATM control unit 7 to the header transformation table 2 will be described.

In this case, when the MODE4 signal is in an active state, the header storage unit 5 generates the address signals and data signals for writing the data into the header transformation table 2 according to the BCD data signals and the ACTL control signals supplied from the ATM control unit 7.

Then, the header storage unit 5 writes the BHD data signals into the header transformation table 2 through the bidirectional bus 9 according to the HCTL control signals supplied from the header storage unit 5 to the header transformation table 2.

Now, in the header transformation table 2, each set of header transformation information contains the HTD flag, idle cell flag, routing tag information and new header information, so that the data exchange between the ATM control unit 7 and the header transformation table 2 is also carried out in units of such a set of the header transformation information.

Here, the rewriting of the data of the header transformation table 2 can be carried out according to the following procedure for example. Namely, first the HTD flag is set into an active state. Then, the idle cell flag, routing tag information, and new header information to be newly written into the header transformation table 2 are written into the header transformation table 2 while the HTD flag is in an active state. Then, after the rewriting is finished, the HTD flag is set back into an inactive state.

By using such a procedure for rewriting data in the header transformation table 2, even when there appears a cell which attempts to carry out the header transformation operation by making an access to the header transformation table 2 during the header transformation table rewriting process, the fact that the header transformation information so obtained is invalid can be recognized by looking at the HTD flag. Thus, when the HTD flag of the obtained header transformation information is in an active state, it indicates that this header transformation information is to be regarded as invalid, so that the cell to which this header transformation information is used in the header transformation operation is subsequently discarded in order to prevent the erroneous transfer of the cell. Similarly, when the idle cell flag of the obtained header transformation information is in an active state, it also indicates that this header transformation information is to be regarded as invalid, so that the cell to which this header transformation information is used in the header transformation operation is subsequently discarded in order to prevent the erroneous transmission of the cell.

Next, the header storage unit 5 generates the MASK1 signal to be given to the cell storage unit 4, which indicates whether the increment is to be given to the writing pointer WP of the cell storage unit 4 according to the HTD flag and the idle cell flag of the header transformation information read out from the header transformation table 2.

Here, in a case the cell is to be discarded because of the invalid header transformation information, the MASK1 signal is set into an active state in order to indicate that the increment is not to be given to the writing pointer WP of the cell storage unit 4. In such a case, the writing pointer WP of the cell storage unit 4 is unchanged for the next cell, so that the next cell will be overwritten into the same address as the cell to be discarded, such that in effect the discarding of the cell to be discarded can be achieved.

Next, a case of data transfer from the header transformation table 2 to the ATM control unit 7 will be described.

In this case, when the MODE4 signal is in an active state, the header storage unit 5 generates the address signals for reading data from the header transformation table 2 through the header storage unit 5 to the ATM control unit 7 according to the BCD data signals and the ACTL control signals supplied from the ATM control unit 7 to the header storage unit 5.

Then, using the generated address signals and the HCTL signals, the header storage unit 5 receives the desired data from the header transformation table 2 through the bidirectional bus 9, and then transmits the read out data to the ATM control unit 7 through the bidirectional bus 10.

The cell output unit 6 receives ODAT1 signals corresponding to the cell data outputted from the cell storage unit 4 in terms of CDAT2 signals, and outputs the corresponding ODAT2 signals representing the received cell data to the ATM cell switch at a timing of rise of the CCK18 signal indicating the top of the cell in the ATM cell switch system by using the BCK18 signals.

Here, the cell output unit 6 generates the read out offset address signal RADR and the read out control signal OCTL to be given to the cell storage unit 4 in a case of receiving the cells to be outputted from the cell storage unit 4.

In addition, the cell output unit 6 also generates an RPMASK signal indicating whether the increment is to be given to the reading pointer RP of the cell storage unit 4, according to an IACK signal supplied from the ATM cell switch which indicate the need for the re-transmission of the cell. In a case the RPMASK signal is in an active state, the MASK2 signal at the cell storage unit 4 is set into an active state, such that the increment is not given to the reading pointer RP in the cell storage unit 4 even when the current reading operation is finished, such that the same cell will be read out again at the next rise of the CCK18 signal and the same cell will be re-transmitted from the cell output unit 6 to the ATM cell switch.

As described, according to the present invention, it becomes possible to prevent the erroneous cell transmissions due to the header transformation operation during the rewriting of the header transformation table, by discarding the erroneously header transformed cell according to the indication of the HTD flag provided in the header transformation information transmitted from the header transformation table to the preliminary operation device.

Moreover, according to the present invention, it becomes possible to recognize cells of different cell types such as idle cells and non-idle cells without using additional hardware components, by utilizing the indication of the idle cell flag provided in the header transformation information transmitted from the header transformation table to the preliminary operation device.

Here, it is to be noted that the present invention can also be applied to the cell types other than that distinguishes the idle cells and the non-idle cells, such as that distinguishes the functionally distinguished cells which are to be processed differently in the preliminary operation system. For example, the cell types for distinguishing branching cells and non-branching cells may be recognized by using the branching cell flag instead of the idle cell flag in the above embodiment, in which case the preliminary operation device can be adapted to carry out the appropriate branching operation only with respect to the branching cells by using the indication of such a branching cell flag. By using such a flag for recognizing functionally distinguished cells, the preliminary operation system with greatly enhanced flexibility can be provided. Namely, when the hardware for distinguishing functionally distinguished cells is used, the hardware is capable only of carrying out the predetermined operation with respect to each VPI/VCI, and the change of the hardware is necessary in order to carry out the other operations, so that there is no flexibility. On the other hand, in the present invention, the change of the operation can be achieved by simply changing the indication of the flag in the header transformation table, so that there is a greatly enhanced flexibility.

Furthermore, according to the present invention, it becomes possible to provide a preliminary operation system in an ATM network capable of carrying out an operation for recognizing cells of different cell types with reduced hardware components, because only a one bit comparator for determining the indication of the flag as 1 or 0 is required, in contrast to the conventional system in which as many comparators as a number of bits of each VPI/VCI would be necessary.

It is also to be noted that, in a case the header transformation table is in a process of being rewritten, instead of discarding the cells after the header transformation is carried out as described in the above embodiment, the preliminary operation device may be controlled such that the execution of the header transformation is waited until the rewriting of the header transformation table is finished. Moreover, such a provision for waiting the execution of the header transformation may be selectively applied only to the cells of higher priority levels in a case the priority levels are provided for the cells.

It is further to be noted that, although the present invention has been described only as the preliminary operation system for an ATM cell switch of an ATM network in the embodiment described above, the present invention may also be adapted to other sections of the ATM network such as a post switch operation section for example.

Besides those already mentioned, many modifications and variations of the above embodiment may be made without departing from the novel and advantageous features of the present invention. Accordingly, all such modifications and variations are intended to be included within the scope of the appended claims.

What is claimed is:

1. A preliminary operation system in an ATM network for carrying out a preliminary operation on cells to be transmitted to an ATM cell switch of the ATM network from input transmission paths, comprising:

header transformation table means for storing header transformation information including a flag for indicating a state of the header transformation table means at a time an access is made to the header transformation means; and preliminary operation means for transforming a header of each cell entered from the input transmission paths into a format suitable for the ATM cell switch so as to obtain a header transformed cell corresponding to said each cell, by accessing to the header transformation table means and utilizing the header transformation information stored in the header transformation table means, according to the state indicated by the flag, and outputting the header transformed cell to the ATM cell switch.

2. The system of claim 1, wherein the state indicated by the flag is whether the header transformation table means is in a process of being rewritten, and when the flag of the header transformation information for said each cell indicates that the header transformation table means is in a process of being rewritten, the preliminary operation means also discards the header transformed cell corresponding to said each cell.

3. The system of claim 2, wherein the preliminary operation means discards said header transformed cell by overwriting a next cell entered from the input transmission paths.

4. The system of claim 1, wherein the preliminary operation means includes:

cell input means for receiving each cell entered from the input transmission paths;

header storage means for making an access to the header transformation table means in order to read out the header transformation information corresponding to said each cell received by the cell input means;

cell storage means for transforming a header of said each cell by using the header transformation information read out by the header storage means according to the state indicated by the flag in order to obtain a header transformed cell corresponding to said each cell, and for storing the header transformed cell; and cell output means for outputting the header transformed cell stored in the cell storage means.

5. A preliminary operation system in an ATM network for carrying out a preliminary operation on cells to be transmitted to an ATM cell switch of the ATM network from input transmission paths, comprising:

header transformation table means for storing header transformation information including a flag for indicating a type of cell for each cell entered from the input transmission paths; and preliminary operation means for transforming a header of each cell entered from the input transmission paths into a format suitable for the ATM cell switch so as to obtain a header transformed cell corresponding to said each cell, by accessing to the header transformation table means and utilizing the header transformation information stored in the header transformation table means, according to the type of cell indicated by the flag, and outputting the header transformed cell to the ATM cell switch.

6. The system of claim 5, wherein the type of cell indicated by the flag is an idle cell, and when the flag indicates that a cell entered from the input transmission paths is the idle cell, the preliminary operation means also discards the header transformed cell corresponding to said cell obtained by using the header transformation information including said flag.

7. The system of claim 6, wherein the preliminary operation means discards said header transformed cell corresponding to said cell by overwriting a next cell entered from the input transmission paths.

8. The system of claim 5, wherein the preliminary operation means includes:

cell input means for receiving each cell entered from the input transmission paths;

header storage means for making an access to the header transformation table means in order to read out the header transformation information corresponding to said each cell received by the cell input means;

cell storage means for transforming a header of said each cell by using the header transformation information read out by the header storage means according to the type of cell indicated by the flag in order to obtain a header transformed cell corresponding to said each cell, and for storing the header transformed cell; and cell output means for outputting the header transformed cell stored in the cell storage means.

9. The system of claim 5, wherein the type of cell indicated by the flag is a branching cell, and when the flag indicates that a cell entered from the input transmission paths is the branching cell, the preliminary operation means also carries out a branching operation.

10. The system of claim 5, wherein the type of cell indicated by the flag distinguishes cells requiring different modes of processing at the preliminary operation means.

11. The system of claim 5, wherein the type of cell indicated by the flag is a cell to be discarded.

12. The system of claim 11, wherein the cell to be discarded is a cell for which an access is made from the preliminary operation means to the header transformation table means while the header transformation means is in a process of being rewritten.

* * * * *